United States Patent
Zaman et al.

(10) Patent No.: US 10,903,992 B2
(45) Date of Patent: Jan. 26, 2021

(54) SYSTEMS AND METHODS FOR ENCRYPTING COMMUNICATION OVER A FIBER OPTIC LINE

(71) Applicant: The Regents of the University of California, Oakland, CA (US)

(72) Inventors: Imam Uz Zaman, Irvine, CA (US); Anthony Bahadir Lopez, Irvine, CA (US); Mohammad Abdullah Al Faruque, Irvine, CA (US); Ozdal Boyraz, Irvine, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 24 days.

(21) Appl. No.: 16/509,999

(22) Filed: Jul. 12, 2019

(65) Prior Publication Data

US 2020/0021433 A1 Jan. 16, 2020

Related U.S. Application Data

(60) Provisional application No. 62/697,875, filed on Jul. 13, 2018.

(51) Int. Cl.
*H04L 9/08* (2006.01)
*H04B 10/25* (2013.01)

(52) U.S. Cl.
CPC ........... *H04L 9/0858* (2013.01); *H04B 10/25* (2013.01)

(58) Field of Classification Search
CPC ... H04L 9/0858; H04L 9/0816; H04L 9/0827; H04L 9/0838; H04L 9/0852; H04L 9/0869; H04B 10/25; H04B 10/70; G06F 7/58
See application file for complete search history.

(56) References Cited

U.S. PATENT DOCUMENTS

2012/0237031 A1* 9/2012 Donnangelo ......... H04L 9/0838
380/256

OTHER PUBLICATIONS

Zaman et, al: Physical Layer Cryptographic Key Generation by Exploiting PMD of an Optical Fiber Link Journal of Lightwave Technology, vol. 36, No. 24, Dec. 15, 2018, pp. 5903-5911 (Year: 2018).*

* cited by examiner

*Primary Examiner* — Paul E Callahan
(74) *Attorney, Agent, or Firm* — Nguyen Tarbet LLC

(57) ABSTRACT

Point Optical Link communication security to help resolve the high resource requirements and lack of a trustworthy source of high randomness of existing communication security solutions is described herein. The scheme includes a novel model and a physical layer symmetric cryptographic key generation technique that focuses on exploiting the physical randomness manifested by the Polarization Mode Dispersion effect. This randomness makes it extremely difficult for an adversary to generate the same cryptographic keys as the communicating parties. 128 bit keys with low final mismatch rates (.ltoreq.10%) can be generated, which could easily be truncated for 64-bit and 32-bit keys if necessary.

20 Claims, 8 Drawing Sheets
(6 of 8 Drawing Sheet(s) Filed in Color)

| Data rate (Gb/s) | PMD limited link length for SMF-28 (km) | Required RSPMF length (m) |
|---|---|---|
| 10 | $6.25 \times 10^4$ | > 45 |
| 20 | $1.5 \times 10^4$ | > 22 |
| 40 | $0.4 \times 10^4$ | > 10 |
| 60 | $0.16 \times 10^4$ | > 8 |

FIG. 4

SYSTEMS AND METHODS FOR ENCRYPTING COMMUNICATION OVER A FIBER OPTIC LINE

CROSS-REFERENCES TO RELATED APPLICATIONS

This application is a non-provisional and claims benefit of U.S. Patent Application No. 62/697,875, filed Jul. 13, 2018, the specification(s) of which is/are incorporated herein in their entirety by reference.

FIELD OF THE INVENTION

The present invention relates to security and encryption of communication channels, in particular, to a symmetric physical layer based secret key generation scheme for Point-to-Point Optical Link (PPOL) communication exploiting Polarization Mode Dispersion (PMD) as a random and inimitable channel characteristic.

BACKGROUND OF THE INVENTION

Over recent decades, the accessibility and bandwidth demand of optical networks have increased tremendously. The Point-to-Point Optical Link (PPOL) has been employed in various applications ranging from Ethernet systems to telecommunications backbone infrastructure as well as military communication systems. Optical link incorporates optical fiber as high speed transmission channels. However, like any other communication channel, optical fiber is vulnerable to many security threats that involve jamming, eavesdropping, interceptions, and infrastructure attacks. In optical networks, an adversary can eavesdrop on an optical system in various ways including physically tapping into the optical fiber or listening to residual crosstalk from an adjacent channel. As the data rate of today's communication networks go beyond 40 Gb/s, the implementation of real time, low latency authentication and security of data transmitted over optical fiber has become one of the most important areas of research. State-of-the-art data security (including fiber optic communication) is implemented by encrypting the data at the transmitter side and decrypting at the receiver side as shown in FIG. 3. In general, cryptography requires one or more unique numbers known as keys.

The cryptographic algorithm can be classified into two major categories: Symmetric and Asymmetric. Symmetric algorithms (like AES, RC4, DES, etc.) use identical cryptographic keys for both encrypting the plaintext as well as decrypting cipher text. Since symmetric algorithms do not require complex bit manipulations, they have low overhead and high performance. However, the key needs to be shared between two or more parties participating in the communication. The secret key is to be transmitted to the receiver side before the information is to be transmitted. It is impractical to ensure that no one will be able to tap communication channels during key exchange unless the channel is secured via cryptography and authentication. Hence, the only secure method of key exchange would be to personally transport the keys directly to the transmitters. This is a major drawback of symmetric key encryption. On the other hand, asymmetric algorithms (like RSA, SSL, DSA etc.) do not involve a shared key for encryption and decryption, but public and private keys instead. However, higher computational power requirements, slow key generation process, more memory space requirements make asymmetric algorithms less suitable for time-critical and resource-limited applications. Thus, various research groups and organizations have proposed to establish a hybrid solution for cryptographic algorithms.

There are many research works on securing fiber-optic communication describing different approaches to establish secure network. However, most of them assume that the adversary either does not have information of a secret parameter or does not have a sophisticated tool to replicate the key generation scheme. These are naive assumptions in today's world. The most secure and solid alternative today is quantum optical-fiber cryptography, which provides impregnable security. However, quantum cryptography is an expensive and sophisticated solution suitable only for critical applications. Further, the secure quantum key distribution itself is a challenging task. Hence, a simple and efficient yet safe method for cryptographic key distribution is necessary. To address this problem, researchers have recently proposed to generate secret keys from the randomness of the physical environment.

The concept of physical layer (PHY) based secret key generation is to exploit the randomly varying properties of the underlying physical layer. In the fiber-optic communication channel, the deployed optical fibers are considered as part of the physical layer (PHY). One prior work presented the use of quantum seals to test the integrity of authenticity of a communication channel by showing how a quantum physical layer senses tempering and how it communicates with the higher protocol layers to allow quantum seals to influence security of data communication. Other previous works have shown that phase fluctuation in the optical fiber is exploited by using a large-scale Mach-Zehnder interferometer to generate and share keys, that optical fiber communication encryption is possible based on four-wave mixing (FWM) in a very high non-linear bismuth-oxide fiber (Bi-NLF) and therefore requires specific fiber deployment, and that the stochastic nature of polarization mode dispersion in optical fiber can be exploited to generate secret keys for cryptography. To summarize the previous works, most of the methods related to physical-layer based fiber optic security require delicate and sophisticated system deployments which are complex and expensive. In addition, almost all of the previous works did not describe the key generation techniques established on their system modeling nor adequate analysis on secret key strength, key mismatch rates and key entropy. Hence, there is a need to solve the security challenges in resource-limited optical fiber links.

SUMMARY OF THE INVENTION

It is an objective of the present invention to provide a low cost, easily deployable symmetric cryptographic key generation technique based on uncompromisable physical randomness. Preliminary analysis has shown that encryption keys based on PMD have high reciprocity and high entropy. The present invention describes herein a detailed system model to exploit the contingent nature of Polarization Mode Dispersion (PMD) using optical switch and Randomly Spliced Polarization Maintaining Fibers (RSPMF). The required length of RSPMF was characterized for different data rates and explained some of their effects on the overall key generation scheme. Based on key generation parameters, the generated keys are 40% different on average compared to keys generated by a malicious non-invasive adversary.

In some aspects, the present invention features a symmetric physical layer based secret key generation scheme for Point-to-Point Optical Link (PPOL) communication by exploiting Polarization Mode Dispersion (PMD) as a random and inimitable channel characteristic. The randomness and security strength of generated cryptographic keys based on PMD is significantly high. Random modulation of a probe signal caused by PMD in a high speed data communication network (40 Gb/s and 60 Gb/s) is reciprocal with average Pearson correlation coefficient of 0.862, despite the presence of optical nonlinearities, dispersion, and noise at the system. A 128 bit symmetric cryptographic key has been successfully generated using the proposed scheme. Simulations with a 50 km link have shown that, with optimal key generation settings, symmetric keys can be generated with high randomness and sufficient generation rates (>50%). It was also found that the generated keys have high average key bit mismatch rates (>40%) with keys generated by an eavesdropper.

According to some aspects, the present invention features a method of generating a set of at least two identical encryption keys for encrypting data across a communication channel shared by at least two entities. The method may comprise coordinating a common time for the at least two entities to begin sampling the stochastic process, and for each entity, sampling a plurality of sample points of the stochastic process, wherein a number of sample points is identical for all of the entities, wherein each sample point has a corresponding index, and quantizing the sample point using a quantization rule for each sample point in the plurality of samples thus sampled to produce a quantized point that is a key bit of the encryption key. The quantization rule is the same for all entities and determines if the key bit is a "1", a "0", or invalid. If the sample point is a "1" or a "0", the sample point is a valid sample point. The indices corresponding to valid sample points comprise a plurality of valid indices, and the key bits of all of the valid sample points together comprise a plurality of key bits. The method further comprises for each entity: sharing the plurality of valid index values with all other entities, producing a plurality of shared valid index values that are common to all of the entities by comparing the pluralities of valid index values and selecting only the valid index values shared by all entities, and selecting the plurality of key bits corresponding to the shared valid index values. The plurality of key bits selected comprises the encryption key.

One of the unique and inventive technical features of the present invention is the pluralities of key bits comprising the encryption keys are generated using a stochastic process of the communications channel shared by the at least two entities. This stochastic process is symmetric and observable to all of the entities. Without wishing to limit the invention to any theory or mechanism, because the stochastic process is common to all entities, the encryption keys that are generated independently by each entity are identical. None of the presently known prior references or work has the unique inventive technical feature of the present invention.

According to other aspects, the present invention features a system for sending encrypted messages between two transceivers on an optical fiber. A pre-defined probe signal is sent between the two transceivers which is symmetrically affected by polarization mode dispersion (PMD) in the optical fiber and the received probe signals are used to generate symmetric encryption keys. The system may comprise the optical fiber, the first transceiver disposed at a first end of the optical fiber, a first sensor disposed at the first end of the optical fiber, capable of observing the PMD of a signal transmitted over the optical fiber, a first processor operatively connected to the first transceiver and the first sensor, the second transceiver disposed at a second end of the optical fiber, a second sensor disposed at the second end of the optical fiber, capable of observing the PMD of a signal transmitted over the optical fiber, and a second processor operatively connected to the second transceiver and the second sensor. The first processor and second processor are configured to execute computer readable instructions. The computer readable instructions may be stored in a non-transitory computer readable storage medium such as a memory device.

In some embodiments, execution of the instructions causes each processor to independently perform operations comprising exchanging the predefined probe signal with the other processor, sampling a fixed number of sample points from the received probe signal at fixed intervals thereby producing a plurality of sample points that each have an index, and quantizing each sample point. Preferably, the same number of sample points is sampled by the processors. Without wishing to limit the invention to a particular theory or mechanism, the plurality of sample points is unique to the received probe signal due to a randomness of the PMD of the signal observed by the sensor. Each quantized sample point is either a "1", a "0", or invalid and the quantized sample points that are "1" or "0" are valid. The index values of the valid sample points are valid index values, and the valid quantized sample points comprise a plurality of key bits corresponding to the plurality of valid index values.

Continuing on, the operations may further comprise transmitting the plurality of valid index values from one transceiver to the other transceiver, receiving a plurality of valid index values from the other transceiver, comparing the two pluralities of valid index values to determine a plurality of shared valid index values, selecting the plurality of key bits corresponding to the plurality of shared valid index values, thereby producing an encryption key, encrypting a message using the encryption key, transmitting the encrypted message from one transceiver to the other transceiver, receiving an encrypted message from the other transceiver, and decrypting the encrypted message using the encryption key. Since the instructions for quantizing the sample points are the same for both processors, the encryption keys generated are identical. As a result, the first transceiver can correctly decrypt the message from the second transceiver, and the second transceiver can correctly decrypt the message from the first transceiver.

In some embodiments, each sample point in the plurality of sample points is quantized by setting the sample point to 1 if the sample value is greater than an upper threshold, or setting the sample point to 0 if the sample is below a lower threshold. The sample point is invalid otherwise. The threshold values can vary depending on the sample index.

In one embodiment, the first end of the optical fiber may comprise a first switch having a first and second setting and disposed nearest the first transceiver, a second switch having a first and second setting and disposed on the first end of the optical fiber, a first length of single-mode fiber (SMF) disposed between the first setting of the first switch and the first setting of the second switch, and a first length of randomly spliced polarization maintaining fiber (RSPMF) disposed between the second setting of the first switch and the second setting of the second switch, in parallel to the first length of SMF. The optical path of the fiber passes through the second switch and either the SMF or RSPMF to the first switch and first transceiver. In further embodiments, the first processor is configured to execute computer readable instructions comprising controlling the first and second switches to switch the optical path between the transceiver and the fiber, between the SMF and RSPMF sections of fiber.

In another embodiment, the second end of the optical fiber comprises a third switch having a first and second setting and disposed at the second transceiver, a fourth switch having a first and second setting and disposed on the second end of the optical fiber, a second length of single-mode fiber (SMF) disposed between the first setting of the third switch and the first setting of the fourth switch, and a second length of randomly spliced polarization maintaining fiber (RSPMF) disposed between the second setting of the third switch and the second setting of the fourth switch, in parallel to the second length of SMF. The optical path of the fiber passes through the fourth switch and either the SMF or RSPMF to the third switch and second transceiver. In further embodiments, the second processor is configured to execute computer readable instructions comprising controlling the third and fourth switches to switch the optical path between the transceiver and the fiber, between the SMF and RSPMF sections of fiber.

In some embodiments, the first and second processors are configured to switch between a key generation mode and a communication mode. Preferably, the processors are synchronized to be in the same mode simultaneously. When the processors are in key generation mode, the processors execute instructions to switch the optical path of the first and second ends to the RSPMF fiber of the ends, and begin sampling upon entering key generation mode. Without wishing to be bound to theory, because the RSPMF is used in key generation mode, an entropy of the resulting encryption keys is higher. When the processors are in communication mode, the processors execute instructions to switch the optical path of the first and second ends to the SMF fiber of the ends. Upon entering communication mode, the processors encrypt messages and transmit and receive encrypted messages.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 4 shows a table summary of maximum allowable transmission distances for fibers with PMD coefficient of 0.04 ps/km1/2 and required RSPMF lengths for key generation.

DESCRIPTION OF PREFERRED EMBODIMENTS

Acronyms

Figure 1:
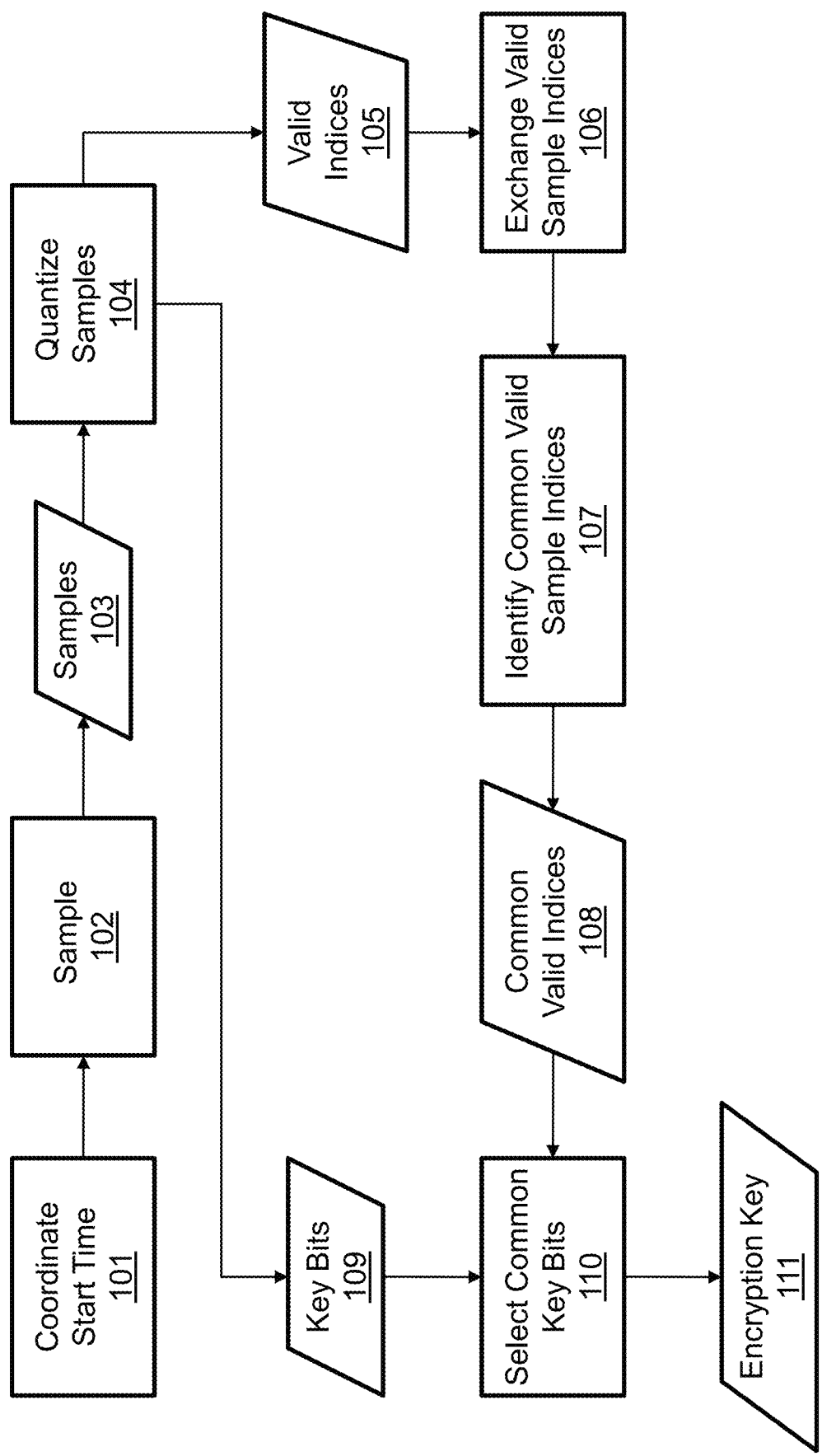
FIG. 1 shows a process flow diagram according to one embodiment of the present invention.

DGD—Differential Group Delay
PMD—Polarization Mode Dispersion
PPOL—Point to Point Optical Link
PSP—Principal States of Polarization
RSPMF—Randomly Spliced Polarization Maintaining Fiber
SMF—Single Mode Fiber Following is a list of elements corresponding to a particular element referred to herein:
200 system
201 optical fiber
202 first transceiver
203 first sensor
204 first processor
205 second transceiver
206 second sensor
207 second processor
208 sample points
209 first plurality of key bits
210 first encryption key
211 first plurality of valid index values
212 sample points
213 second plurality of key bits
214 second encryption key
215 second plurality of valid index values
216 plurality of shared valid index values
301 first switch
302 second switch
303 first length of SMF
304 first length of RSPMF
305 third switch
306 fourth switch
307 second length of SMF
308 second length of RSPMF Referring now to FIG. 1, in some embodiments, the present invention features a method of generating a set of at least two identical encryption keys for encrypting data across a communication channel shared by at least two entities. The encryption keys are generated independently by the at least two entities and from a stochastic process of the communications channel shared by the at least two entities. The stochastic process is a random process that is observable simultaneously at multiple locations in a system and to all of the at least two entities.

In one embodiment, the method may comprise coordinating a common time for the at least two entities to begin sampling the stochastic process (101); for all of the entities, simultaneously sampling a plurality of sample points of the stochastic process (102), wherein the number of sample points is identical for all of the entities, wherein each sample point has a corresponding index, for each entity, for each sample in the plurality of samples (103) thus sampled, quantizing the sample point using a quantization rule (104), wherein the quantization rule is the same for all entities, wherein the quantized point is a key bit of the encryption key, wherein the quantization rule determines if the key bit is a one"1", a "0", or invalid, wherein if the sample point is a "1" or a "0", it is a valid sample point, wherein the indices corresponding to the valid sample points comprise a plurality of valid indices (105), wherein the key bits of all of the valid sample points together comprise a plurality of key bits (109), for each entity, sharing the plurality of valid index values with all other entities in the at least two entities (106); for each entity, comparing the pluralities of valid index values for all of the other entities, selecting only the valid index values shared by all entities (107), and producing a plurality of shared valid index values (108) that are common to all of the at least two entities; and for each entity, selecting the plurality of key bits corresponding to the shared valid index values (110). The plurality of key bits thus selected comprises the encryption key (111). Without wishing to limit the present invention, because the stochastic process is symmetric and observable to all of the entities, and the process used to generate the plurality of key bits is common to all entities, the encryption keys thus generated are identical.

In some embodiments the communications channel is a fiber optic line, wherein there are two transceivers at either end of the line, wherein the stochastic process is polarization mode dispersion process. The polarization mode dispersion process manifests over a distance such that the two entities are located within a distance from one another along the optical fiber where both can observe the polarization mode dispersion process.

In some embodiments the quantization rule comprises an upper and a lower threshold, wherein the key bit is a 1 if the sample value is greater than the upper threshold, wherein the key bit is 0 if the sample is below the lower threshold, wherein the sample is invalid otherwise. In some embodiments, the threshold values vary depending on the sample index.

Figure 2:
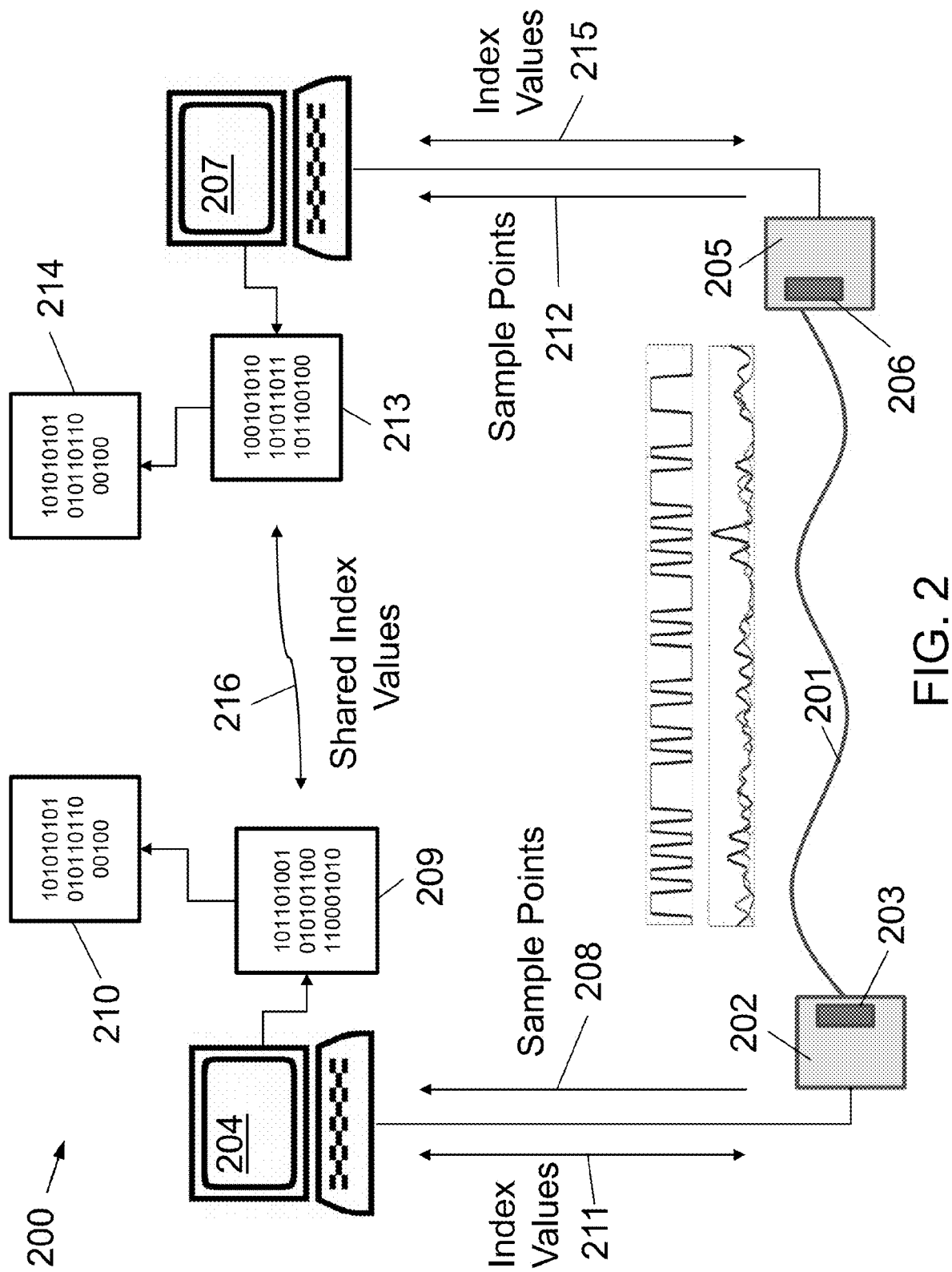
FIG. 2 shows a schematic of a system according to one embodiment of the present invention.
Figure 3:
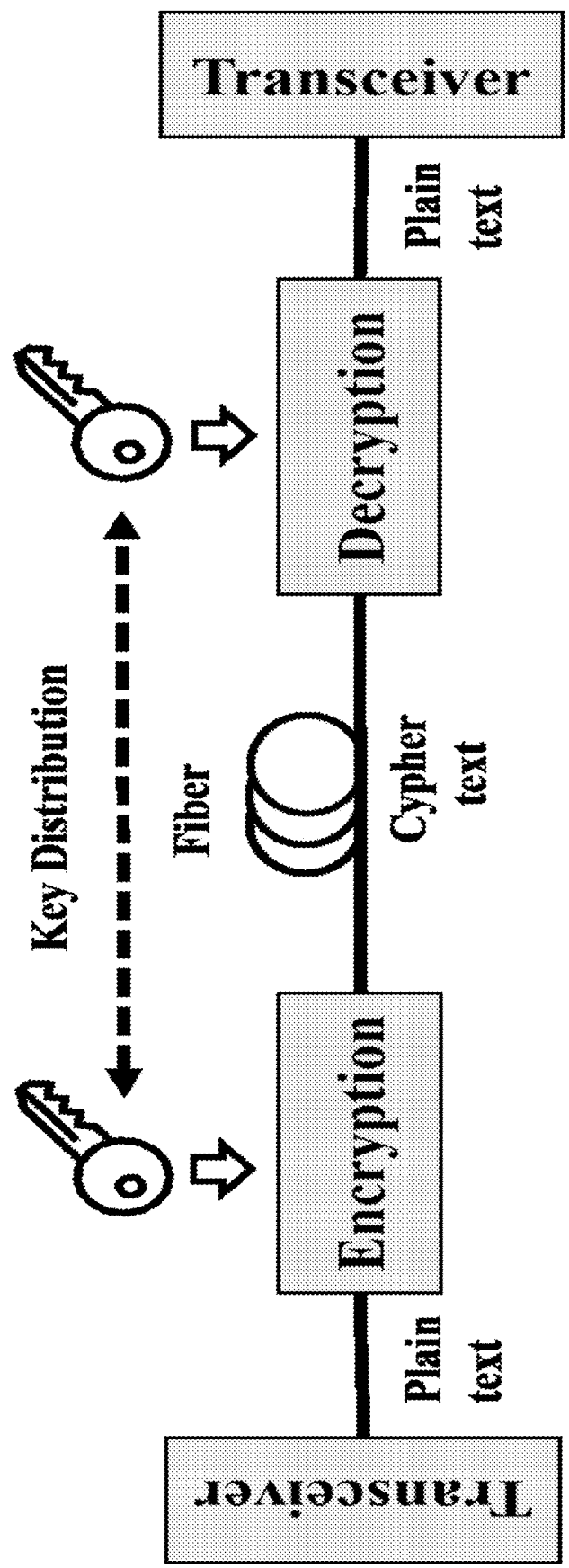
FIG. 3 shows a concept diagram of the prior art in encrypted communication over fiber optic lines. Identical encryption keys are distributed to both transceivers from an outside source.

Referring to FIG. 2, in some embodiments, the present invention comprises a system (200) for sending encrypted messages between two transceivers on an optical fiber. A pre-defined probe signal can be sent between the two transceivers which is symmetrically affected by polarization mode dispersion in the optical fiber. The received probe signals can be used to generate symmetric encryption keys. In some embodiments, the system (200) may comprise an optical fiber (201), a first transceiver (202) disposed at a first end of the optical fiber, a first sensor (203) disposed at a first end of the optical fiber and capable of observing the polarization mode dispersion of a signal transmitted over the optical fiber, a first processor (204) operatively connected to the first transceiver and the first sensor, a second transceiver (205), a second sensor (206) disposed on the second end of the optical fiber and capable of observing the polarization mode dispersion of a signal transmitted over the optical fiber, and a second processor (207) operatively connected to the second transceiver and the second sensor, capable of executing computer readable instructions.

In one embodiment, the first processor is capable of executing computer readable instructions. The computer readable instructions may be stored in a memory. In some embodiments, the computer readable the instructions may comprise: instructions for sending messages to the second transceiver via the first transceiver, and for receiving messages from the second transceiver via the first transceiver (101); instructions for exchanging a predefined probe signal with the second processor; instructions for sampling (102) a fixed number of sample points (103, 208) from the received probe signal at fixed intervals, producing a first plurality of sample points wherein each sample point has an index; instructions for quantizing the first plurality of sample points (104), wherein the quantized sample point is a "1" or a "0", or invalid, wherein the quantized sample points that are "1" or "0" are valid, wherein the index values of the valid sample points comprise a first plurality of valid index values (105, 211), wherein the valid quantized sample points comprise a first plurality of key bits (109, 209) corresponding to the first plurality of valid index values; instructions for transmitting the first plurality of valid index values (211) to the second transceiver (106); instructions for receiving a second plurality of valid index values (215) from the second transceiver (106); instructions for comparing the first plurality of valid index values to the second plurality of valid index values, and for determining a plurality of shared valid index values (107, 216); instructions for selecting the plurality of key bits (110) corresponding to the plurality of shared valid index values (108, 216), wherein the plurality of key bits thus selected comprises a first encryption key (210); instructions for encrypting a message using the first encryption key; instructions for transmitting the encrypted message to the second transceiver; instructions for receiving an encrypted message from the second transceiver; and instructions for decrypting the encrypted message using the first encryption key.

In another embodiment, the second processor (207) is capable of executing computer readable instructions. The computer readable instructions may be stored in a memory. In some embodiments, the computer readable instructions may comprise: instructions for sending messages to the first transceiver (202) via the second transceiver (205) and receiving messages from the first transceiver via the second transceiver; instructions for exchanging the predefined probe signal with the first processor; instructions for sampling a fixed number of sample points (212) from the received probe signal at fixed intervals, producing a second plurality of sample points wherein each sample point has an index; instructions for quantizing the second plurality of sample points, wherein the quantized sample point is a "1" or a "0", or invalid, wherein the quantized sample points that are "1" or "0" are valid, wherein the index values of the valid sample points comprise a second plurality of valid index values (215), wherein the valid quantized sample points comprise a second plurality of key bits (213) corresponding to the second plurality of valid index values, instructions for transmitting the second plurality of valid index values to the first transceiver, instructions for receiving a first plurality of valid index values from the first transceiver, instructions for comparing the first plurality of valid index values to the second plurality of valid index values, and for determining a plurality of shared valid index values (216); instructions for selecting the plurality of key bits corresponding to the shared valid index values, wherein the plurality of key bits thus selected is a second encryption key (214); instructions for encrypting a message using the second encryption key; instructions for transmitting the encrypted message to the first transceiver; instructions for receiving an encrypted message from the first transceiver; and instructions for decrypting the encrypted message using the second encryption key.

In some embodiments, the instructions for quantizing the sample points are the same for both processors. In some embodiments, the same number of sample points may be sampled by both processors. Thus, the encryption keys generated are identical, and as a result, the first transceiver is able to correctly decrypt the message from the second transceiver, and the second transceiver is able to correctly decrypt the message from the first transceiver.

In some embodiments of the system, the quantization rule comprises an upper and a lower threshold. In one embodiment, the key bit is a 1 if the sample value is greater than the upper threshold, the key bit is 0 if the sample is below the lower threshold, and the sample is invalid otherwise. In another embodiment, the threshold values may vary depending on the sample index.

In some embodiments, the first and second ends of the optical fiber may be composed of randomly spliced polarization maintaining fibers (RSPMF). In other embodiments, the first and second ends of the optical fiber may be composed of single-mode fibers (SMF). In one embodiment, the first end may comprise a first switch (301) having a first and second setting and disposed nearest the first transceiver, a second switch (302) having a first and second setting and disposed on the first end of the optical fiber, a first length of SMF (303) disposed between the first setting of the first switch and the first setting of the second switch, and a first length of RSPMF (304) disposed between the second setting of the first switch and the second setting of the second switch, in parallel to the first length of SMF. The optical path of the fiber passes through the second switch and either the SMF or RSPMF to the first switch and first transceiver. The first processor is further configured to execute computer readable instructions comprising controlling the first and second switches to switch the optical path between the transceiver and the fiber, between the SMF and RSPMF sections of fiber.

In other embodiments, the second end of the optical fiber may comprise a third switch (305) having a first and second setting and disposed at the second transceiver, a fourth switch (306) having a first and second setting and disposed on the second end of the optical fiber, a second length of SMF (307) disposed between the first setting of the third switch and the first setting of the fourth switch, and a second length of RSPMF (308) disposed between the second setting of the third switch and the second setting of the fourth switch, in parallel to the second length of SMF (307). The optical path of the fiber passes through the fourth switch and either the SMF or RSPMF to the third switch and second transceiver. The second processor is further configured to execute computer readable instructions comprising controlling the third and fourth switches to switch the optical path between the transceiver and the fiber, between the SMF and RSPMF sections of fiber.

In some embodiments, the first and second processors are configured to switch between a key generation mode and a communication mode. The processors can be synchronized to be in the same mode simultaneously. In one embodiment, when the processors are in key generation mode, the processors execute instructions to switch the optical path of the first and second ends to the RSPMF of the ends. The processors begin sampling upon entering key generation mode. Because the RSPMF is used in key generation mode, the entropy of the resulting encryption keys is higher. In another embodiment, when the processors are in communication mode, the processors execute instruction to switch the optical path of the first and second ends to the SMF fiber of the ends. Upon entering communication mode, the processors encrypt messages and transmit and receive encrypted messages.

According to some embodiments, the key generation scheme of the present invention exploits the physical randomness from the Polarization Mode Dispersion (PMD) effect in the optical fiber link to generate symmetric secret keys. In an illustrative embodiment, the secret keys may be generated for two parties, for example, Alice and Bob. To do this, Alice and Bob independently process and quantize the samples they attained from sending the probe signals to each other. Then, to reduce the mismatch rate between Alice's generated keys and Bob's generated keys, the two parties perform a mismatch removal step.

EXAMPLE

The following is a non-limiting example of the present invention. It is to be understood that said example is not intended to limit the present invention in any way. Equivalents or substitutes are within the scope of the present invention.

The key generation scheme of this invention is based on the random variation from PMD. PMD is related to differential group delay (DGD) caused by birefringence in the optical fiber in a long haul network, PMD=<Δτ>, where <Δτ> is the average value of DGD. Birefringence varies along the fiber length and is totally non-stationary stochastic in nature. It arises from different internal and external stresses on the fiber including core asymmetry, non-uniform loading, bends and twists. PMD is a random effect because it relies on the instantaneous weak birefringence state of the fiber link. The state of the art maximum allowable PMD of a communication link is less than one tenth of a bit period (T). Many experiments with fiber of various lengths proved that PMD of a fiber link is proportional to the square root of the fiber length as in equation (1), where L is the length of the fiber.

$$\text{PMD}=\text{PMD}_{coefficient} \times \sqrt{L} \qquad (1)$$

Commercially available SMF-28 fibers have PMD coefficient of:

$$\text{PMD}_{coefficient}=0.04 \text{ ps}/\sqrt{km}-0.1 \text{ ps}/\sqrt{km} \qquad (2)$$

Figure 5:
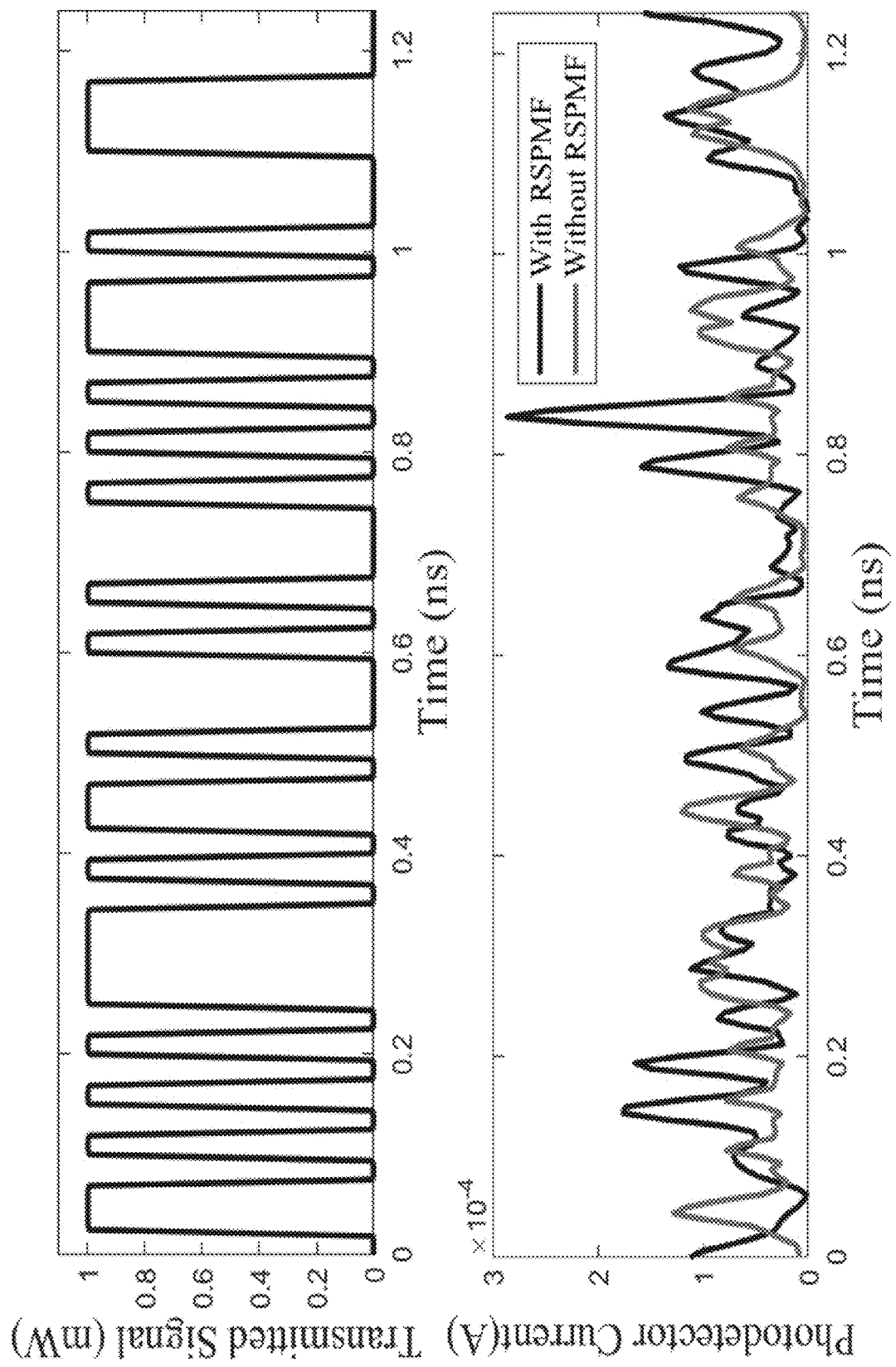
FIG. 5 shows a transmitted random optical signal at 40 Gbps (top) and received signal with and without RSPMF of a 50 km PPOL (bottom). Presence of RSPMF to modulate the probe signal stochastically. RSPMF significantly increases the entropy of the received signal.

Equation (1) reveals that, depending on the data communication rate, commercially available SMF-28 with PMD coefficient of:

$$\text{PMD}_{coefficient} \approx 0.04 \text{ ps}/\sqrt{km} \qquad (3)$$

the PMD effect manifests itself over an extremely large distance as shown in FIG. 4. As a consequence, the cryptographic keys generated from the modulated bit streams based on commercial SMF-28 possess low entropy. In FIG. 5, the top figure shows the transmitted pre-defined bit sequence and the bottom figure shows the received signal. The received signal without RSPMF has analogous variation as the pre-defined bit sequence for a 50 km Link. Using RSPMF can increase the randomness and entropy as shown in FIG. 5 (bottom).

Figure 6:
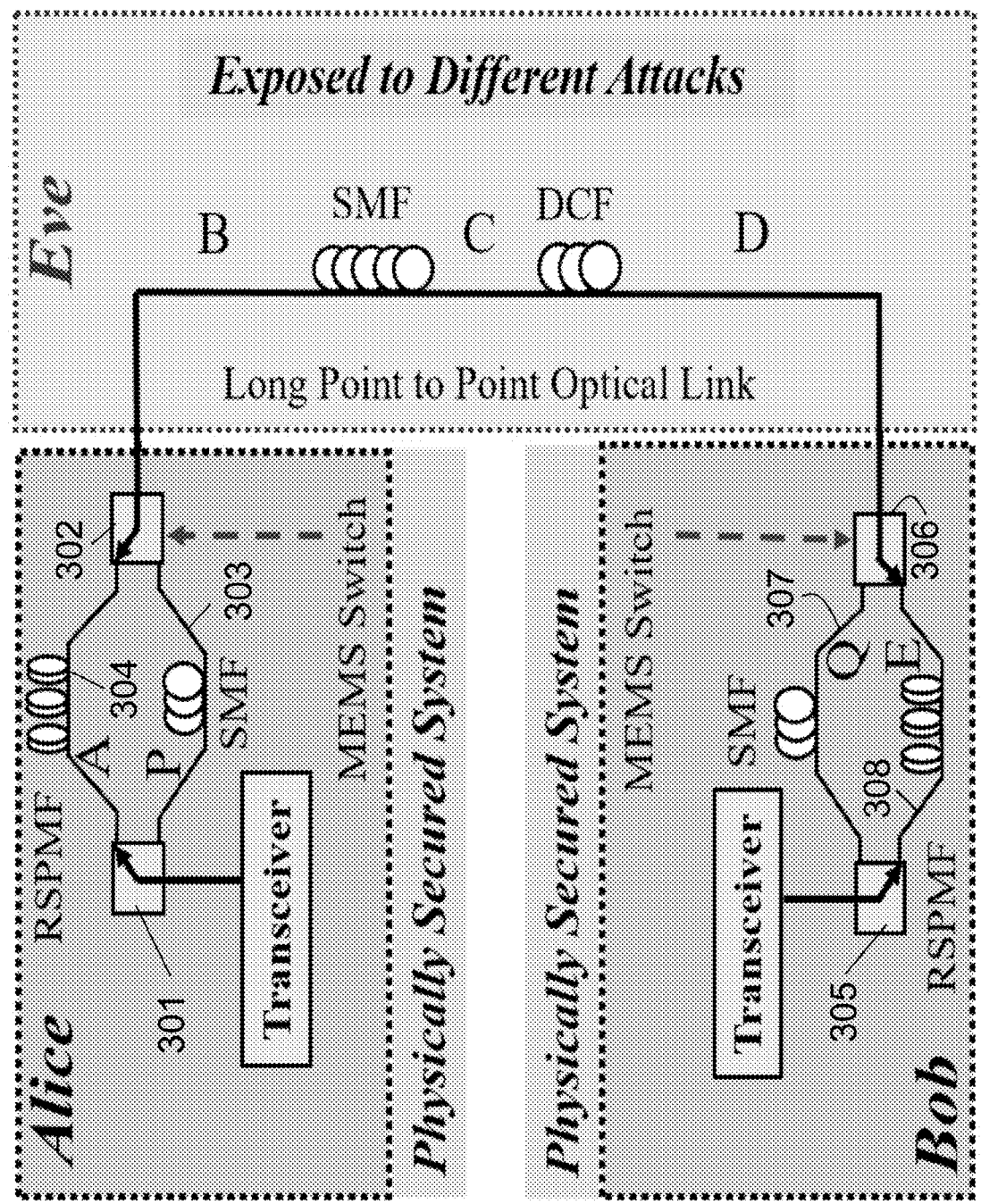
FIG. 6 shows a diagram of the PMD based key generation scheme incorporating RSPMF. Alice and Bob are the two legitimate communication parties. The adversary (EVE) has access to the fiber network constitutes of SMF and Dispersion Compensated Fiber (DCF).
Figure 7:
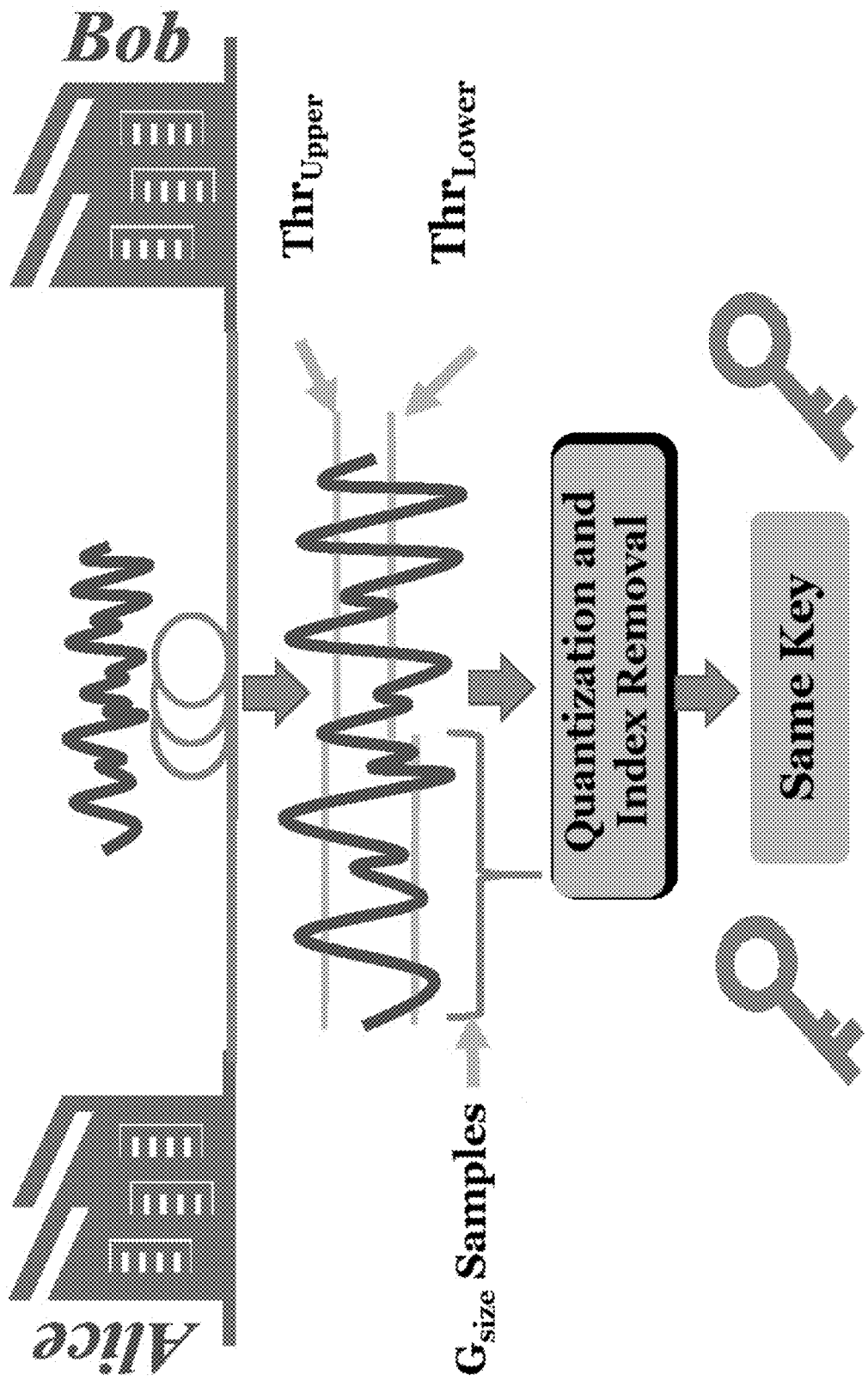
FIG. 7 shows a diagram of quantization and index matching step.

To mimic the effect of Polarization Mode dispersion of a long haul fiber network in a smaller dispersion compensated Point to Point Optical Link (PPOL), two sections of RSPMF were incorporated at both transceiver ends as shown in FIG. 6. The purpose of the RSPMF is to increase the PMD effect significantly. As a result, the stochastic and random modulation of a pre-defined probe signal can be exploited to generate symmetric cryptographic keys. The state-of-the-art polarization-maintaining fibers with very high birefringence (beat length range 3.0-5.0 mm) are suitable to fabricate RSPMF. The required lengths of RSPMF to manifest random modulation for different data rates (2) are mentioned in FIG. 4.

To prove the concept and to assess the feasibility of the invention, a point-to-point optical link simulation model was developed. FIG. 6 shows the PMD based key generation scheme incorporating Randomly Spliced Polarization Maintaining Fibers (RSPMF) of the invention. Alice and Bob are two legitimate communication parties who want to communicate over a secured communication channel with symmetric cryptography. A hypothetical adversary (EVE) has access to the fiber network constitutes of SMF and Dispersion Compensated Fiber (DCF). As mentioned earlier, symmetric encryption algorithms are faster and require less processing overhead compared to asymmetric algorithms. Using the present method, Alice and Bob will be able to generate and exchange strong symmetric cryptographic keys to encode their plaintext without facing the key transportation challenges.

The system (200) works in two modes: communication mode and key generation mode. The state of the link can switch between modes very fast with current technologies. For instance, the switching time between these two modes is <0.5 ms by using commercially available fast optomechanical MEMS switches. In key generation mode, the communication link between Alice and Bob is A-B-C-D-E in FIG. 6. The Differential Group Delay (DGD) between two Principal States of Polarization (PSP) will be higher and more stochastic due to the high PMD effect from the long SMF-28 fibers in between the transceivers and the RSPMF and SMF pigtails in this path. After the key establishment agreement between Alice and Bob, the system will go into communication mode and send signals via the P-B-C-D-Q path just as in a conventional point-to-point optical fiber link. In key generation mode, the changes in the Differential Group Delay follow a Maxwell probability distribution as given in (4), where l, $\Delta\tau$, $q^2$ are fiber length, the average DGD and the variance of the Maxwell distribution, respectively:

$$P(\Delta\tau, l) = \frac{2\Delta\tau^2}{\sqrt{2\Pi} \, q^3} \exp\left[-\frac{\Delta\tau^2}{2q^2}\right] \quad (4)$$

Due to the orthogonality of the input principle state of the polarization (PSP), any input polarization can be written as a vector sum of its components. Equation (5) states the output electric field vector in the time domain:

$$\vec{E}_{out}(t) = r_+ \vec{\varepsilon}_{out+} e^{j\phi_+} E_{in}(t+\tau_+) + r_- \vec{\varepsilon}_{out-} e^{j\phi_-} E_{in}(t+\tau_-) \quad (5)$$

wherein $r_+$ and $r_-$ are the complex projections, $\varepsilon_{out+}$ and $\varepsilon_{out-}$ are unit vectors of the output PSP and $\phi\pm$ are the constant phases picked by the polarization modes, and $\Delta\tau=|\tau_+ - \tau_-|$ represents the DGD.

The method adopted the discrete waveplate model and used Jones matrix calculations to simulate the model of the invention in Matlab. In the model, a long single mode fiber is simulated as the concatenation of a large number of birefringent waveplates each having the same indices but different lengths and orientations. If excluding the polarization dependent loss, the frequency dependence of Jones matrix, and temperature fluctuation, any waveplate can be represented by (6):

$$M(\omega) = \quad (6)$$

$$S(-\theta)e^{-\frac{j\omega L(n_{fast}+n_{slow})}{2c}} \times \left[e^{-\frac{-j\omega L(n_{fast}-n_{slow})}{2}} 0; 0 \; e^{\frac{j\omega L(n_{fast}-n_{slow})}{2}}\right] \times S(\theta)$$

where $S(\theta)$ denotes the rotation of the fast axis of the wave plate by $\theta$ degree from +x axis, L is the fiber length, $n_{fast}$ and $n_{slow}$ are the refractive indices for fast and slow modes, respectively.

In the simulations, it was found that there is high reciprocity of the modulated probe signal in Alice's and Bob's channel. Across ten probe signals (1024 samples), the average Pearson correlation coefficient between Bob's received samples and Alice's received samples was 0.862 when the data rate was 60 Gb/s and 0.868 when the data rate was 40 Gb/s (1.0 is the maximum).

Physical-Layer Key Generation Scheme

The key generation scheme of the present invention exploits the physical randomness from the PMD effect in the optical fiber link to generate symmetric secret keys for Alice and Bob. To do this, Alice and Bob independently process and quantize the samples they attained from sending the probe signals to each other. Then, to reduce the mismatch rate between Alice's generated keys and Bob's generated keys, the two parties perform a mismatch removal step.

The first step in the key generation scheme involves Alice and Bob independently splitting their sets of received samples $X_{Alice}$ and $X_{Bob}$ into subsets/groups notated as $X_{Alice,i} \subseteq X_{Alice}$ and $X_{Alice,i} \subseteq X_{Alice}$ each of size $G_{size}$ (the size of the last group may be less than or equal to $G_{size}$). Then, Alice and Bob take the average $\mu(x_{id,i})$ and the standard deviation $\sigma(x_{id,i})$ of each group and from them compute an upper threshold $Thr_{upper}(x_{id,i})$ and a lower threshold $Thr_{lower}(x_{id,i})$, where id$\in$\{Alice,Bob\}. The thresholds are defined as follows:

$$Thr_{upper}(x_{id,i}) = \mu(x_{id,i}) + \alpha^* \sigma(x_{id,i}) \quad (7)$$

$$Thr_{lower}(x_{id,i}) = \mu(x_{id,i}) - \alpha^* \sigma(x_{id,i}) \quad (8)$$

The programmable parameter, a, is assumed to be constant. Nonetheless, it could be a unique value per threshold definition. Per each subset $x_{id,(i,j)}$, Alice and Bob will generate thresholds and iterate through each sample $x_{id(i,j)}$. They will either quantize the sample into a binary value for their corresponding secret key and store its index for a later step or discard the sample and index. Alice and Bob will have a set with the quantized and stored key bits denoted as $K_{id}$ and the stored indexes denoted as $J_{id}$. The pseudocode for the simple key bit quantization of a sample is defined as follows:

if $x_{id,(i,j)} \geq Thr_{upper}(x_{id,i})$ then $K_{id} + \{1\}; J_{id} + \{j\}$;

else if $x_{id,(i,j)} \leq Thr_{lower}(x_{id,i})$ then $K_{id} + \{0\}; J_{id} + \{j\}$;

else do nothing

After each group of samples is quantized into secret key bits, Alice and Bob will perform a secure mismatch removal step without revealing the secret key bits. This requires Alice and Bob to store the indices of the samples that were successfully quantized in their own sets, $J_{alice}$ and $J_{bob}$ respectively. Because of system noise and the choices for $\alpha$ and $G_{size}$, these sets may not match one another. Thus, Alice and Bob must exchange these sets (note that the actual values or key bits are not revealed in this manner) to compare their own sets with the received sets and remove indices that do not exist in the received sets. Only the quantized secret key bits corresponding to the indices that have not been removed can be used in the final keys. The following is the pseudocode for the index removal and exchange steps from the perspective of one of the parties:

Define id1,id2∈{alice,bob}s.t.id1≠id2 for each $j \in J_{id1}$;

if $j \notin J_{id2}$ then $J_{id1} = J_{id1} - \{j\}$;

else do nothing

Simulation Tools

Figure 8:
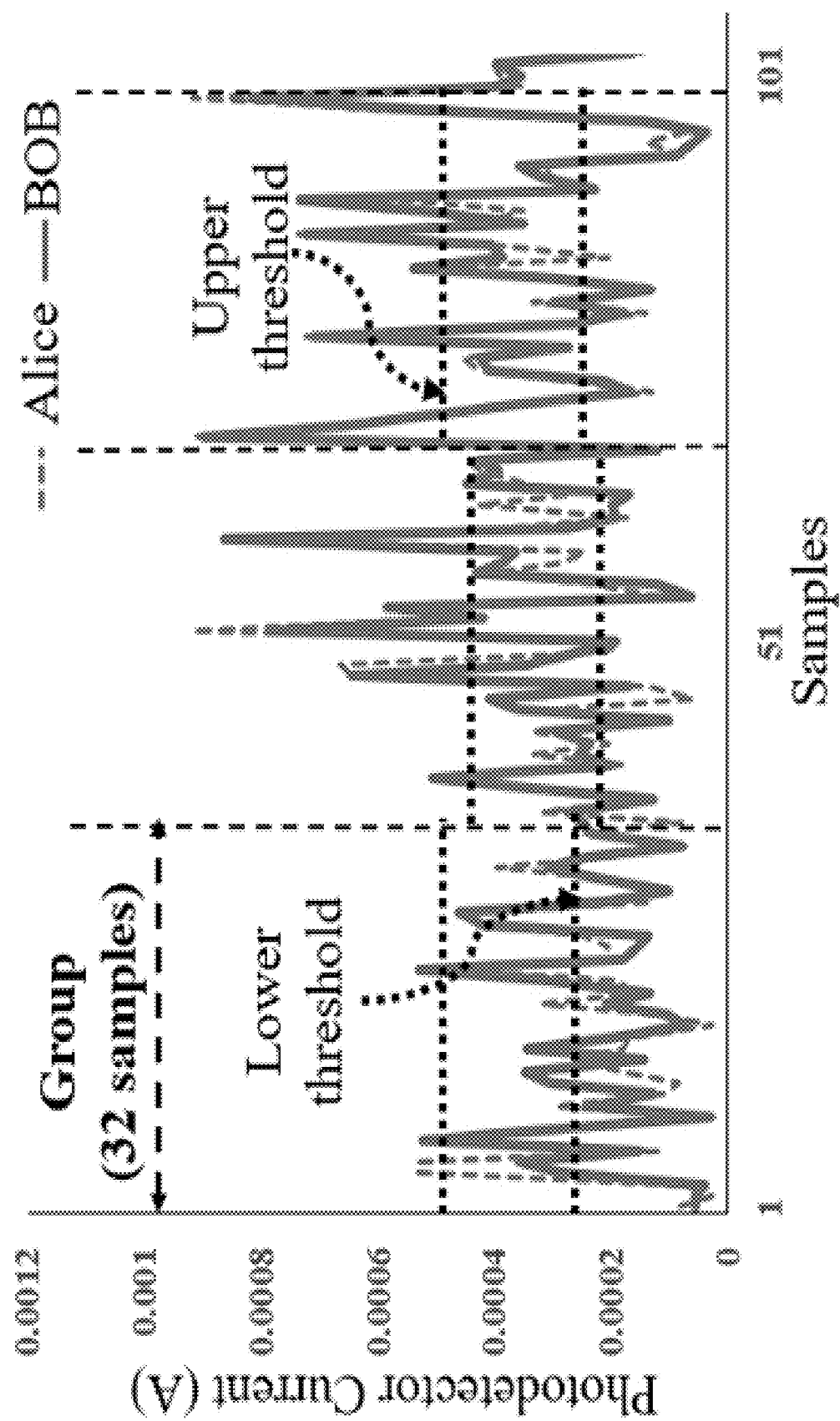
FIG. 8 shows sample thresholding for 60 Gb/s PMD modulated data for quantization of the signals received by the two entities.

Signal propagation through the system is modeled by a combination of commercial simulation tools including VPI transmission Maker to generate the probe signal's bit sequence, to create the modulated NRZ optical signal, to detect the signal at the detector and to include Relative Intensity Noise (RIN), shot noise, thermal noise, etc. The propagation of the optical signal in both directions based on the split-step method is modeled in MATLAB. The reciprocity check and the key generation algorithm are implemented in MATLAB as well. Simulations were performed according to different bit rates (40 Gb/s, 60 Gb/s) and different link lengths (50 km, 10 km) to check the reciprocity and entropy of the modulated signal due to high PMD. The rate of change of average DGD is considerably slower than the data transmission rate (40 Gb/s, 60 Gb/s). Hence, the channel response can be considered as constant during probe signal propagation. FIG. 8 is an example of the received signal thresholding for Alice and Bob at 60 Gb/s.

As used herein, the term "about" refers to plus or minus 10% of the referenced number. Various modifications of the invention, in addition to those described herein, will be apparent to those skilled in the art from the foregoing description. Such modifications are also intended to fall within the scope of the appended claims.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of generating a set of at least two identical encryption keys, for encrypting data across a communication channel shared by at least two entities, said method comprising:
   a. coordinating a common time for the at least two entities to begin sampling a stochastic process;
   b. for each entity, sampling a plurality of sample points of the stochastic process wherein a number of sample points is identical for all of the entities, wherein each sample point has a corresponding index;
   c. quantizing the sample point using a quantization rule for each sample point in the plurality of samples thus sampled, wherein the quantization rule is the same for all entities, wherein the quantized point is a key bit of the encryption key, wherein the quantization rule determines if the key bit is a "1", a "0", or invalid, wherein if the sample point is a "1" or a "0", the sample point is a valid sample point, wherein indices corresponding to valid sample points comprise a plurality of valid indices, wherein the key bits of all of the valid sample points together comprise a plurality of key bits,
   d. for each entity, sharing the plurality of valid index values with all other entities;
   e. for each entity, producing a plurality of shared valid index values that are common to all entities by comparing the pluralities of valid index values and selecting only the valid index values shared by all entities; and
   f. for each entity, selecting the plurality of key bits corresponding to the shared valid index values, wherein the plurality of key bits thus selected comprises the encryption key;
   wherein the pluralities of key bits comprising the encryption keys are generated using a stochastic process of the communications channel shared by the at least two entities,
   wherein the stochastic process is symmetric and observable to all of the entities,
   wherein because the stochastic process is common to all entities, the encryption keys that are generated independently by each entity are identical.

2. The method of claim 1, wherein the communications channel is a fiber optic line, wherein the at least two entities are two transceivers at either end of the line, wherein the stochastic process is polarization mode dispersion wherein the polarization mode dispersion process manifests over a distance such that the two entities are located within a distance from one another along the optical fiber where both can observe the polarization mode dispersion process.

3. The method of claim 1, wherein the quantization rule comprises an upper and a lower threshold, wherein the key bit is a 1 if the sample value is greater than the upper threshold, wherein the key bit is 0 if the sample is below the lower threshold, wherein the sample is invalid otherwise.

4. The method of claim 3, wherein the threshold values vary depending on the sample index.

5. A system for sending encrypted messages between two transceivers on an optical fiber, wherein a pre-defined probe signal is sent between the two transceivers which is symmetrically affected by polarization mode dispersion in the optical fiber, wherein the received probe signals are used to generate symmetric encryption keys, the system comprising:
   a. a memory storing computer-readable instructions;
   b. an optical fiber;
   c. a first transceiver of the two transceivers, disposed at a first end of the optical fiber;
   d. a first sensor, disposed at a first end of the optical fiber, capable of observing the polarization mode dispersion of a signal transmitted over the optical fiber;
   e. a first processor, operatively connected to the first transceiver and the first sensor, capable of executing computer readable instructions stored in the memory comprising:
      i. instructions for sending messages to a second transceiver of the two transceivers via the first transceiver, and for receiving messages from the second transceiver via the first transceiver;
ii. instructions for exchanging a predefined probe signal with the second processor;
iii. instructions for sampling a fixed number of sample points from the received probe signal at fixed intervals, producing a first plurality of sample points wherein each sample point has an index;
iv. instructions for quantizing the first plurality of sample points, wherein the quantized sample point is a "1" or a "0", or invalid, wherein the quantized sample points that are "1" or "0" are valid, wherein the index values of the valid sample points comprise a first plurality of valid index values, wherein the valid quantized sample points comprise a first plurality of key bits corresponding to the first plurality of valid index values;
v. instructions for transmitting the first plurality of valid index values to the second transceiver;
vi. instructions for receiving a second plurality of valid index values from the second transceiver;
vii. instructions for comparing the first plurality of valid index values to the second plurality of valid index values, and for determining a plurality of shared valid index values;
viii. instructions for selecting the plurality of key bits corresponding to the plurality of shared valid index values, wherein the plurality of key bits thus selected comprises a first encryption key;
ix. instructions for encrypting a message using the first encryption key; x. instructions for transmitting the encrypted message to the second transceiver;
xi. instructions for receiving an encrypted message from the second transceiver; and
xii. instructions for decrypting the encrypted message using the first encryption key;
f. the second transceiver;
g. a second sensor, disposed on the second end of the optical fiber, capable of observing the polarization mode dispersion of a signal transmitted over the optical fiber; and
h. a second processor, operatively connected to the second transceiver and the second sensor, capable of executing computer readable instructions stored in the memory comprising:
i. instructions for sending messages to the first transceiver via the second transceiver and receiving messages from the first transceiver via the second transceiver;
ii. instructions for exchanging the predefined probe signal with the first processor;
iii. instructions for sampling a fixed number of sample points from the received probe signal at fixed intervals, producing a second plurality of sample points wherein each sample point has an index;
iv. instructions for quantizing the second plurality of sample points, wherein the quantized sample point is a "1" or a "0", or invalid, wherein the quantized sample points that are "1" or "0" are valid, wherein the index values of the valid sample points comprise a second plurality of valid index values, wherein the valid quantized sample points comprise a second plurality of key bits corresponding to the second plurality of valid index values,
v. instructions for transmitting the second plurality of valid index values to the first transceiver, vi. instructions for receiving a first plurality of valid index values from the first transceiver,
vii. instructions for comparing the first plurality of valid index values to the second plurality of valid index values, and for determining a plurality of shared valid index values;
viii. instructions for selecting the plurality of key bits corresponding to the shared valid index values, wherein the plurality of key bits thus selected is a second encryption key;
ix. instructions for encrypting a message using the second encryption key;
x. instructions for transmitting the encrypted message to the first transceiver;
xi. instructions for receiving an encrypted message from the first transceiver; and
xii. instructions for decrypting the encrypted message using the second encryption key;
wherein the instructions for quantizing the sample points are the same for both processors, wherein the same number of sample points is sampled by both processors, wherein consequently the encryption keys generated are identical, wherein, as a result, the first transceiver is able to correctly decrypt the message from the second transceiver, and the second transceiver is able to correctly decrypt the message from the first transceiver.

6. The system of claim 5, wherein the quantization rule comprises an upper and a lower threshold, wherein the key bit is a 1 if the sample value is greater than the upper threshold, wherein the key bit is 0 if the sample is below the lower threshold, wherein the sample is invalid otherwise.

7. The system of claim 6, wherein the threshold values vary depending on the sample index.

8. The system of claim 5, wherein the optical fiber comprises a first end and a second end, wherein the first and second ends are composed of randomly spliced polarization maintaining fibers.

9. The system of claim 5, wherein the first end comprises:
a. a first switch, having a first and second setting, disposed nearest the first transceiver;
b. a second switch, having a first and second setting, disposed on the first end of the optical fiber;
c. a first length of single-mode fiber (SMF), disposed between the first setting of the first switch and the first setting of the second switch; and
d. a first length of randomly spliced polarization maintaining fiber (RSPMF), disposed between the second setting of the first switch and the second setting of the second switch, in parallel to the first length of single mode fiber; wherein the optical path of the fiber passes through the second switch and either the SMF or RSPMF to the first switch and first transceiver, wherein the first processor is configured to execute computer readable instructions comprising controlling the first and second switches to switch the optical path between the transceiver and the fiber, between the SMF and RSPMF sections of fiber.

10. The system of claim 9, wherein the second end comprises:
a. a third switch, having a first and second setting, disposed at the second transceiver;
b. a fourth switch, having a first and second setting, disposed on the second end of the optical fiber;
c. a second length of single-mode fiber (SMF), disposed between the first setting of the third switch and the first setting of the fourth switch; and d. a second length of randomly spliced polarization maintaining fiber (RSPMF), disposed between the second setting of the third switch and the second setting of the fourth switch, in parallel to the second length of SMF; wherein the optical path of the fiber passes through the fourth switch and either the SMF or RSPMF to the third switch and second transceiver, wherein the second processor is configured to execute computer readable instructions comprising controlling the third and fourth switches to switch the optical path between the transceiver and the fiber, between the SMF and RSPMF sections of fiber.

11. The system of claim 5, wherein the first and second processors are configured to switch between a key generation mode and a communication mode, wherein the processors are synchronized to be in the same mode simultaneously.

12. The system of claim 11, wherein when the processors are in key generation mode, the processors execute instructions to switch the optical path of the first and second ends to the RSPMF fiber of the ends, wherein the processors begin sampling upon entering key generation mode, wherein because the RSPMF is used in key generation mode, the entropy of the resulting encryption keys is higher.

13. The system of claim 11, wherein when the processors are in communication mode, the processors execute instruction to switch the optical path of the first and second ends to the SMF fiber of the ends, wherein upon entering communication mode, the processors encrypt messages and transmit and receive encrypted messages.

14. A system for sending encrypted messages between two transceivers on an optical fiber, wherein a pre-defined probe signal is sent between the two transceivers which is symmetrically affected by polarization mode dispersion (PMD) in the optical fiber, wherein the received probe signals are used to generate symmetric encryption keys, the system comprising:
  a. a computer-readable memory storing instructions;
  b. the optical fiber;
  c. the first transceiver disposed at a first end of the optical fiber;
  d. a first sensor disposed at the first end of the optical fiber, capable of observing the PMD of a signal transmitted over the optical fiber;
  e. a first processor operatively connected to the first transceiver and the first sensor;
  f. the second transceiver disposed at a second end of the optical fiber;
  g. a second sensor disposed at the second end of the optical fiber, capable of observing the PMD of a signal transmitted over the optical fiber; and
  h. a second processor operatively connected to the second transceiver and the second sensor; wherein the first processor and second processor are configured to execute computer readable instructions stored in the memory that causes each processor to independently perform operations comprising:
    i. exchanging the predefined probe signal with the other processor;
    ii. sampling a fixed number of sample points from the received probe signal at fixed intervals, thereby producing a plurality of sample points, each sample point having an index, wherein a same number of sample points is sampled by the processors, wherein the plurality of sample points is unique to the received probe signal due to a randomness of the PMD of the signal observed by the sensor;
    iii. quantizing each sample point of the plurality of sample points, wherein the quantized sample point is either a "1", a "0", or invalid, wherein the quantized sample points that are "1" or "0" are valid, wherein the index values of the valid sample points are valid index values, wherein the valid quantized sample points comprise a plurality of key bits corresponding to the plurality of valid index values;
    iv. transmitting the plurality of valid index values from one transceiver to the other transceiver;
    v. receiving a plurality of valid index values from the other transceiver;
    vi. comparing the two pluralities of valid index values to determine a plurality of shared valid index values;
    vii. selecting the plurality of key bits corresponding to the plurality of shared valid index values, thereby producing an encryption key;
    viii. encrypting a message using the encryption key;
    ix. transmitting the encrypted message from one transceiver to the other transceiver;
    x. receiving an encrypted message from the other transceiver; and
    xi. decrypting the encrypted message using the encryption key;
    wherein instructions for quantizing the sample points are the same for both processors, wherein the encryption keys generated are identical, and as a result, the first transceiver is able to correctly decrypt the message from the second transceiver, and the second transceiver is able to correctly decrypt the message from the first transceiver.

15. The system of claim 14, wherein each sample point in the plurality of sample points is quantized by setting the sample point to 1 if the sample value is greater than an upper threshold, or setting the sample point to 0 if the sample is below a lower threshold, wherein the sample point is invalid otherwise, wherein the threshold values vary depending on the sample index.

16. The system of claim 14, wherein the first end of the optical fiber comprises:
  a. a first switch, having a first and second setting, disposed nearest the first transceiver;
  b. a second switch having a first and second setting, disposed on the first end of the optical fiber;
  c. a first length of single-mode fiber (SMF), disposed between the first setting of the first switch and the first setting of the second switch; and
  d. a first length of randomly spliced polarization maintaining fiber (RSPMF), disposed between the second setting of the first switch and the second setting of the second switch, in parallel to the first length of single mode fiber; wherein the optical path of the fiber passes through the second switch and either the SMF or RSPMF to the first switch and first transceiver, wherein the first processor is configured to execute computer readable instructions comprising controlling the first and second switches to switch the optical path between the transceiver and the fiber, between the SMF and RSPMF sections of fiber.

17. The system of claim 16, wherein the second end of the optical fiber comprises:
  a. a third switch, having a first and second setting, disposed at the second transceiver;
  b. a fourth switch, having a first and second setting, disposed on the second end of the optical fiber;

c. a second length of single-mode fiber (SMF) disposed between the first setting of the third switch and the first setting of the fourth switch; and d. a second length of randomly spliced polarization maintaining fiber (RSPMF), disposed between the second setting of the third switch and the second setting of the fourth switch, in parallel to the second length of SMF;

wherein the optical path of the fiber passes through the fourth switch and either the SMF or RSPMF to the third switch and second transceiver, wherein the second processor is configured to execute computer readable instructions comprising controlling the third and fourth switches to switch the optical path between the transceiver and the fiber, between the SMF and RSPMF sections of fiber.

18. The system of claim 14, wherein the first and second processors are configured to switch between a key generation mode and a communication mode, wherein the processors are synchronized to be in the same mode simultaneously.

19. The system of claim 18, wherein when the processors are in key generation mode, the processors execute instructions to switch the optical path of the first and second ends to the RSPMF fiber of the ends, wherein the processors begin sampling upon entering key generation mode, wherein because the RSPMF is used in key generation mode, an entropy of the resulting encryption keys is higher.

20. The system of claim 18, wherein when the processors are in communication mode, the processors execute instructions to switch the optical path of the first and second ends to the SMF fiber of the ends, wherein upon entering communication mode, the processors encrypt messages and transmit and receive encrypted messages.

\* \* \* \* \*